United States Patent Office 2,710,872
Patented June 14, 1955

2,710,872
PRODUCTION OF ESTERS OF DITHIOCARBAMIC ACID

Ralph B. Thompson, Hinsdale, Ill., assignor to Universal Oil Products Company, Des Plaines, Ill., a corporation of Delaware No Drawing. Application April 12, 1954, Serial No. 422,695

20 Claims. (Cl. 260—326.5)

This application is a continuation-in-part of my co-pending application Serial No. 250,817, filed October 10, 1951.

This invention relates to new compounds of sulfur and to methods for their production. More particularly, this invention relates to esters of dithiocarbamic acids, and still more particularly to gamma-keto esters of dithiocarbamic acids.

An object of this invention is a process for the production of a gamma-keto alkyl ester of a dithiocarbamic acid.

A still further object of this invention is a process for the production of a gamma-ketopropyl ester of N,N-diethyl-dithiocarbamic acid.

An additional object of this invention is a process for the production of a gamma-ketobutyl ester of N,N-diethyl-dithiocarbamic acid.

One embodiment of this invention relates to a process for producing an ester of a dithiocarbamic acid which comprises reacting at a temperature below its decomposition temperature a dithiocarbomic acid with an alpha,-beta-unsaturated compound.

Another embodiment of this invention relates to a process for producing a gamma-ketoalkyl ester of a dithiocarbamic acid which comprises reacting a dithiocarbamic acid with an alpha,beta-unsaturated aldehyde at a temperature of from about —10° to about 0° C.

A further embodiment of this invention relates to a process for producing a gamma-ketoalkyl ester of a dithiocarbamic acid which comprises reacting a dithiocarbamic acid with an alpha,beta-unsaturated ketone at a temperature of from about —10° to about 0° C.

The alpha,beta-unsaturated compounds which are reacted with a dithiocarbamic acid according to the process of this invention are characterized by the presence of an "active" olefinic or double bond. This olefinic or double bond has its activity enhanced for the present process by the presence on an adjacent carbon atom to the double bond of certain activating groups among which are included a keto group, a cyano group, a sulfone group, a sulfoxide group, a nitro group, or a pyridine nucleus. While the exact manner in which these activating groups increase the activity of the double bond thereby producing "active" olefins is not known, they effectively render these particular olefins "active" at low temperature for reaction with a dithiocarbamic acid. The "active" olefins which are used as starting materials in this process may be obtained from any suitable source. Generic formulae of suitable utilizable active olefins are given in the following Table I:

TABLE I

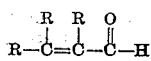

α,β-Unsaturated aldehydes

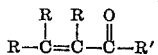

α,β-Unsaturated ketones

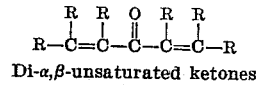

Di-α,β-unsaturated ketones

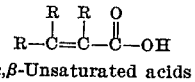

α,β-Unsaturated acids

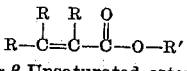

α,β-Unsaturated esters

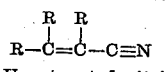

α,β-Unsaturated nitriles

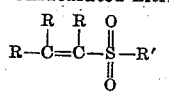

α,β-Unsaturated sulfones

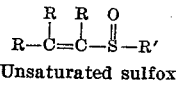

α,β-Unsaturated sulfoxides

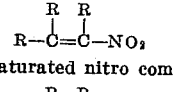

α,β-Unsaturated nitro compounds

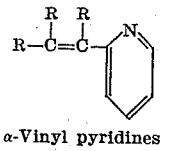

α-Vinyl pyridines

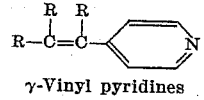

γ-Vinyl pyridines

In the preceding table, R represents a member of the group consisting of hydrogen, an alkyl group, an aryl group, an alkaryl group, an aralkyl group, and a heterocyclic group, and R' represents a member of the group consisting of an alkyl group, an aryl group, an alkaryl group, an aralkyl group, and a heterocyclic group. Simple members of the above group of compounds are formed when R is hydrogen and R' is a methyl group. Such compounds are illustrated in the following table:

TABLE II

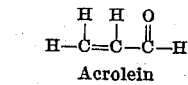

Acrolein

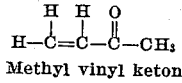

Methyl vinyl ketone

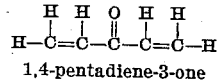

1,4-pentadiene-3-one

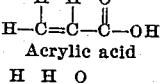

Acrylic acid

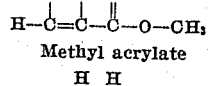

Methyl acrylate

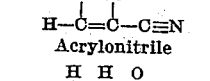

Acrylonitrile

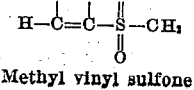

Methyl vinyl sulfone

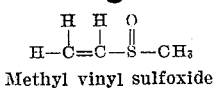
Methyl vinyl sulfoxide

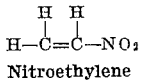
Nitroethylene

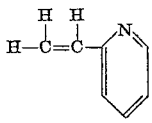
α-Vinyl pyridine

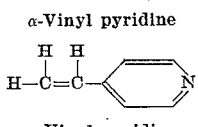
γ-Vinyl pyridine

Other utilizable alpha,beta-unsaturated aldehydes in addition to acrolein include crotonaldehyde, tiglic aldehyde, citral, 2,6-nonadiene-1-al, alpha-ethyl-beta-propyl acrolein, etc. Alpha,beta-unsaturated ketones which are used as starting materials in this process include methyl vinyl ketone, ethyl vinyl ketone, propyl vinyl ketone, butyl vinyl ketone, etc., phenyl vinyl ketone, tolyl vinyl ketone, etc., mesityl oxide, benzalacetone, benzalacetophenone, dypnone, pseudo ionone, etc. Di-alpha,beta-unsaturated ketones in addition to 1,4-pentadiene-3-one which are used as starting materials in this process include 4-oxo-2,5-heptadiene, 5-oxo-3,6-nonadiene, 6-oxo-4,7-undecadiene, 7-oxo-5,8-tridecadiene. dibenzalacetone, phorone, di-cinnamylidine, acetone, difurfuralacetone, 2,6-dicyclohexylidine cyclohexanone, dicyclohexylidine acetone, etc. Alpha,beta-unsaturated acids in addition to acrylic acid which are used as starting materials in this process include crotonic acid, isocrotonic acid, angelic acid, tiglic acid, geranic acid, dihydrogeranic acid, etc. Alpha,beta-unsaturated esters in addition to methyl acrylate include ethyl acrylate, etc., methyl crotonate, ethyl crotonate, propyl crotonate, etc. Other unsaturated compounds with an active double bond which are used as starting materials in this process include 1-cyano-propylene, 2-cyanopropylene, ethyl vinyl sulfone, propyl vinyl sulfone, ethyl vinyl sulfoxide, propyl vinyl sulfoxide, 1-nitro-propylene, 2-nitro-propylene, omega-nitrostyrene, etc. Other alpha,beta-unsaturated compounds containing an active double bond are well known in the art and within the broad scope of this invention.

Dithiocarbamic acid and various derivatives such as alkyl-, dialkyl-, alkylaryl-, aryl-, and diaryl-dithiocarbamic acids which are suitable as starting materials in this process are rather unstable organic compounds which may be prepared by reacting ammonia, an alkylamine, a dialkyl amine, an alkyl aryl amine, an aryl amine, a diaryl amine, or a heterocyclic secondary amine such as pyrrolidine with carbon disulfide in caustic solution at a relatively low temperature, generally below about 65° in order to form the sodium salts of the dithiocarbamic acids are then treated with either aqueous hydrogen chloride or alcoholic hydrogen chloride to liberate the free dithiocarbamic acids which are stable for a short time in the cold such as at temperatures of from about −10° to about +30° C. The dithiocarbamic acids which are reacted with an alpha, beta-unsaturated compound according to the process of this invention include dithiocarbamic acid, N-methyl-dithiocarbamic acid, N-ethyl-dithiocarbamic acid, N-propyl-dithiocarbamic acid, N-butyl-dithiocarbamic acid, etc., N,N-dimethyl-dithiocarbamic acid, N,N-diethyl-dithiocarbamic acid, N-methyl-N-ethyl-dithiocarbamic acid, N,N-dipropyl-dithiocarbamic acid, N-methyl-N-phenyl-dithiocarbamic acid, N-ethyl-N-phenyl-dithiocarbamic acid, N-propyl-N-phenyl-dithiocarbamic acid, etc., N-methyl-N-tolyl-dithiocarbamic acid, N-phenyl-dithiocarbamic acid, N-tolyl-dithiocarbamic acid, N,N-diphenyl-dithiocarbamic acid, N,N-tetramethylene-dithiocarbamic acid, N,N-pentamethylene-dithiocarbamic acid, etc.

These dithiocarbamic acids may then be reacted with an alpha,beta-unsaturated compound such as an alpha,beta-unsaturated aldehyde or alpha-beta-unsaturated ketone, a specific example of this process being illustrated by the following equation which indicates the reaction between N,N-dimethyl-dithiocarbamic acid and methyl vinyl ketone to form gamma-ketobutyl-N,N-dimethyl-dithiocarbamate:

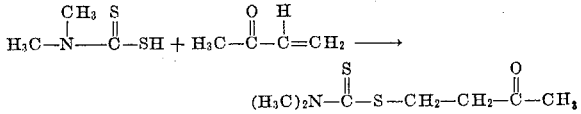

To produce such a gamma-ketoalkyl-dithiocarbamate the reaction mixture is maintained at a temperature below the decomposition temperature of the dithiocarbamic acid and preferably at a temperature of from about −10° to about 0° C. The resultant reaction mixture is stirred and permitted to warm to a temperature of about 20° C. in order to separate therefrom the resultant gamma-ketoalkyl-dithiocarbamate as for example gamma-ketobutyl-dithiocarbamate. The farther separation of the desired product is effected by adding the entire reaction product to water (or vice versa) and extracting the aqueous mixture with an organic solvent such as diethyl ether or other suitable organic solvent in which the gamma-ketoalkyl-dithiocarbamate is soluble. The ether solution or other solvent solution is then fractionally distilled in order to separate the solvent from the desired gamma-ketoalkyl-dithiocarbamate which is generally liquid at room temperature and atmospheric pressure.

The gamma-ketoalkyl-dithiocarbamates and related compounds which are formed as hereinabove set forth are useful as intermediates in the production of medicinals, bactericides, insecticides, etc. These compounds may be utilized also as antioxidants to delay the development of rancidity in lard.

The nature of this invention is illustrated further by the following examples which are given with no intention of limiting unduly the generally broad scope of the invention.

*Example I*

One mol of diethylamine and one mol of sodium hydroxide were mixed by stirring in 250 cc. of methanol employed as a solvent. The resultant mixture was surrounded by a cooling bath while one mole of carbon disulfide was slowly added thereto with stirring at a temperature which was kept below 65° C. The resultant reaction mixture contained the sodium salt of N,N-diethyl-dithiocarbamic acid. This solution containing the sodium salt of N,N-diethyldithiocarbamic acid was kept cold while one mole of hydrochloric acid was added slowly thereto in order to liberate the free N,N-diethyl-dithiocarbamic acid which, although unstable, can be kept for a short time at a temperature of about 0° C. This solution of N,N-diethyl-dithiocarbamic acid was stirred and reacted with methyl vinyl ketone at a temperature of from about −10° to about 0° C. and then the reaction mixture was permitted to warm slowly to room temperature after which it was added to a large volume of water from which the organic material was extracted with ether. The ether solution was then fractionally distilled to remove the ether and leave a heavy liquid of specific gravity 1.100 at 15° C., refractive index $n_D^{20}$ over 1.5550, and a sulfur content of 28.9% by weight. This sulfur analysis corresponds closely to the 29.2% by weight calculated for gamma-ketobutyl-N,N-diethyl-dithiocarbamate having the formula:

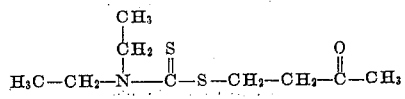

Example II

One-half mol of diethylamine and one-half mol of sodium hydroxide were mixed by stirring in 150 cc. of methanol employed as the solvent. One-half mol of carbon disulfide was added slowly thereto with stirring. The resultant mixture contained the sodium salt of N,N-diethyl-dithiocarbamic acid. This solution containing the sodium salt of N,N-diethyl-dithiocarbamic acid was cooled to −15° C. and one-half mol of hydrochloric acid was added slowly thereto (keeping the temperature below −10° C.) in order to liberate the free N,N-diethyl-dithiocarbamic acid. This solution of N,N-diethyl-dithiocarbamic acid was stirred and reacted with crotonaldehyde (one-half mol) at a temperature of about −10 to about 0° C. and the whole mixture was permitted to warm slowly to room temperature after which a large volume of water was added. Addition of the water caused the separation of a heavy oil as a separate layer at the bottom. This oil was extracted in ether, dried over calcium chloride, and the solvent removed under vacuum. The yield was 65 grams, corresponding to about 60% of the theoretical. Upon standing at room temperature the liquid slowly becomes more viscous tending to become a solid resinous material. The structure of the 1-methyl-3-keto-propyl-N,N-diethyl-dithiocarbamate is as follows:

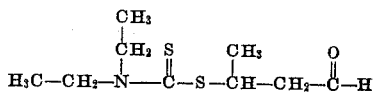

Example III

One-half mol of pyrrolidine and one-half mol of sodium hydroxide were mixed by stirring in 150 cc. of methanol employed as the solvent. One-half mol of carbon disulfide was added slowly thereto with stirring. The resultant reaction mixture contains the sodium salt of N,N-tetramethylenedithiocarbamic acid. This solution containing the sodium salt of N,N-tetramethylene-dithiocarbamic acid was cooled to −15° and one-half mol of hydrochloric acid was added slowly thereto in order to liberate the free N,N-tetramethylene-dithiocarbamic acid which although unstable, can be kept for a time at a temperature of about 0° C. This solution of N,N-tetramethylene-dithiocarbamic acid was stirred and reacted with crotonaldehyde (one-half mol) at a temperature of from about −10° to about 0° C. and then the reaction mixture was permitted to warm slowly to room temperature. Addition of a large volume of water caused the separation of a heavy oil which was extracted with ether, dried over sodium sulfate, and the ether removed under vacuum. The yield was 79 grams, equivalent to about 73% of theoretical. The sulfur analysis of this product was 28.4% by weight which corresponds closely to the 29.5% by weight calculated for 1-methyl-3-keto-propyl-N,N-tetramethylene-dithiocarbamate having the formula:

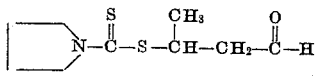

Example IV

In a manner similar to Example I, dimethylamine (0.5 mol) is reacted with carbon disulfide in caustic methanol solution. The N,N-dimethyl-dithiocarbamic acid is sprung from the caustic by the addition of the requisite amount of hydrochloric acid for neutralization. To this solution is added ethyl vinyl sulfone (0.5 mol) after which the reaction mixture is allowed to warm to room temperature. Extraction with ethyl ether and distillation yields an ester of N,N-dimethyl-dithiocarbamic acid having the following formula:

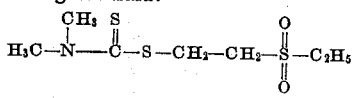

This compound can be named (beta-ethylsulfonylethyl)-N,N-dimethyl-dithiocarbamate.

Example V

In a manner similar to Example I, approximately 0.2 mols of N,N-diethyl-dithiocarbamic acid is prepared by the reaction of diethylamine with carbon disulfide in caustic methanol solution. To this solution in the cold is added approximately 0.2 mol of omega-nitrostyrene. From the resultant reaction mixture after extraction and distillation is recovered alpha-phenyl-beta-nitro-ethyl-N,N-diethyl-dithiocarbamate having the following formula:

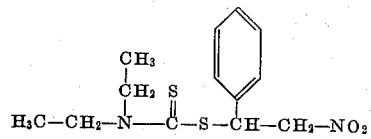

I claim as my invention:

1. A process for producing an ester of a dithiocarbamic acid which comprises reacting at a temperature below its decomposition temperature a dithiocarbamate acid with an alpha,beta-unsaturated compound.

2. A process for producing an ester of a dithiocarbamic acid which comprises reacting at a temperature of from about −10° C. to about 0° C. a dithiocarbamic acid with an alpha,beta-unsaturated compound.

3. A process for producing an ester of an N,N-dialkyl-dithiocarbamic acid which comprises reacting at a temperature of from about −10° C. to about 0° C. an N,N-dialkyl-dithiocarbamic acid with an alpha,beta-unsaturated compound.

4. A process for producing a gamma-ketoalkyl-dithiocarbamate which comprises reacting a dithiocarbamic acid with an alpha,beta-unsaturated ketone at a temperature below the decomposition temperature of said dithiocarbamic acid.

5. A process for producing a gamma-ketoalkyl-dithiocarbamate which comprises reacting a dithiocarbamic acid with an alpha,beta-unsaturated ketone at a temperature of from about −10° to about 0° C.

6. A process for producing a gamma-ketoalkyl-N,N-dialkyl-dithiocarbamate which comprises reacting an N,N-dialkyl-dithiocarbamic acid with an alpha,beta-unsaturated ketone at a temperature of from about −10° to about 0° C.

7. A process for producing a gamma-ketobutyl-N,N-dialkyl-dithiocarbamate which comprises reacting an N,N-dialkyl-dithiocarbamic acid with methyl vinyl ketone at a temperature of from about −10° to about 0° C.

8. A process for producing a gamma-ketobutyl-N,N-diethyl-dithiocarbamate which comprises reacting an N,N-diethyl-dithiocarbamic acid with methyl vinyl ketone at a temperature of from about −10° to about 0° C.

9. A process for producing a gamma-ketoalkyldithiocarbamate which comprises reacting a dithiocarbamic acid with an alpha,beta-unsaturated aldehyde at a temperature below the decomposition temperature of said dithiocarbamic acid.

10. A process for producing a gamma-ketoalkyl-dithiocarbamate which comprises reacting a dithiocarbamic acid with an alpha,beta-unsaturated aldehyde at a temperature of from about −10° to about 0° C.

11. A process for producing a gamma-ketoalkyl-N,N-dialkyl-dithiocarbamate which comprises reacting an N,N-dialkyl-dithiocarbamic acid with an alpha,beta-unsaturated aldehyde at a temperature of from about −10° to about 0° C.

12. A process for producing an alpha-methyl-gamma-ketopropyl-N,N-dialkyl-dithiocarbamate which comprises reacting an N,N-dialkyl-dithiocarbamic acid with crotonaldehyde at a temperature of from about −10° to about 0° C.

13. A process for producing an alpha-methyl-gamma-ketopropyl-N,N-diethyl-dithiocarbamate which comprises reacting N,N-diethyl-dithiocarbamic acid with crotonaldehyde at a temperature of from about −10° to about 0° C.

14. A process for producing alpha-methyl-gamma-ketopropyl - N,N - tetramethylene-dithiocarbamate which comprises reacting N,N-tetramethylene-dithiocarbamic acid with crotonaldehyde at a temperature of from about −10° to about 0° C.

15. A process for producing a beta-sulfonyl ester of a dithiocarbamic acid which comprises reacting a dithiocarbamic acid with an alpha,beta-unsaturated sulfone at a temperature below the decomposition temperature of said dithiocarbamic acid.

16. A process for producing a beta-sulfonyl ester of a dithiocarbamic acid which comprises reacting a dithiocarbamic acid with an alpha,beta-unsaturated sulfone at a temperature of from about −10° to about 0° C.

17. A process for producing beta-ethylsulfonylethyl-N,N-dimethyl-dithiocarbamate which comprises reacting N,N-dimethyl-dithiocarbamic acid with ethyl vinyl sulfone at a temperature of from about −10° to about 0° C.

18. A process for producing a beta-nitroalkyl-dithiocarbamate which comprises reacting a dithiocarbamic acid with an alpha,beta-unsaturated nitro compound at a temperature below the decomposition temperature of said dithiocarbamic acid.

19. A process for producing a beta-nitroalkyl-dithiocarbamate which comprises reacting a dithiocarbamic acid with an alpha,beta-unsaturated nitro compound at a temperature of from about −10° to about 0° C.

20. A process for producing alpha-phenyl-beta-nitroethyl-N,N-diethyl-dithiocarbamate which comprises reacting N,N-diethyl-dithiocarbamic acid with omega-nitrostyrene at a temperature of from about −10° to about 0° C.

No references cited.